3,168,417
POLYIMIDE COATED FLUOROCARBON
INSULATED WIRE
Robert E. Smith, Jr., Burlington, and John M. Gardner, South Hero, Vt., assignors to Haveg Industries, Inc., Wilmington, Del., a corporation of Delaware
Filed Sept. 25, 1963, Ser. No. 311,420
19 Claims. (Cl. 117—213)

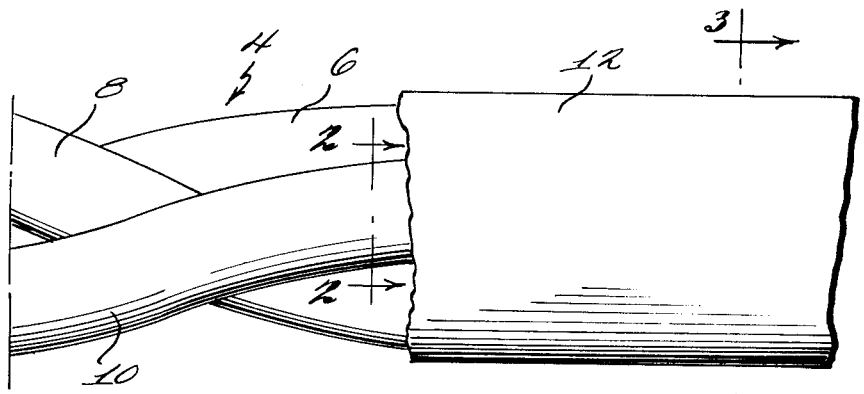
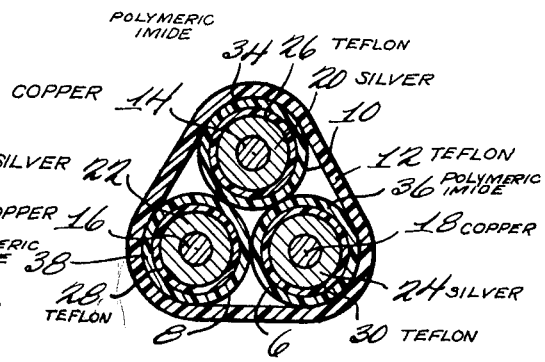
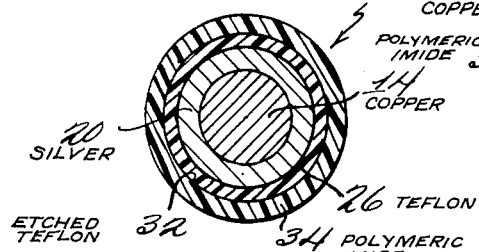

This invention relates to the preparation of improved electrical insulation.

It has been proposed in the past to employ fluorocarbon polymers such as polytetrafluoroethylene (Teflon) or tetrafluoroethylene - hexafluoropropylene polymer (FEP) as a coating for electrical wiring. One of the big limitations of Teflon and FEP coated electrical wiring has been their poor resistance to abrasion and their poor adhesion characteristics.

Abrasion resistance can be improved by compounding with other fillers, fibers and resins which, however, unfortunately generally decrease the electrical insulating qualities of the composition. The use of thin jackets or coatings of other materials over the fluorocarbon polymer normally creates adhesion problems. Moreover, such coatings, in general, have far poorer temperature resistance than the Teflon or FEP, and one of the main reasons for using Teflon or FEP is to obtain good high temperature resistance.

Accordingly, it is an object of the present invention to improve the abrasion resistance of fluorocarbon polymer coated electrical wires.

Another object is to improve the pottability of fluorocarbon polymer coated electrical wires.

A further object is to devise a high temperature resistance coating for perfluorocarbon polymer insulated electrical wires.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by coating the fluorocarbon polymer insulated electrical wires with polyimides containing the imide linkage as part of a 5 or 6 membered heterocyclic ring.

The polymeric imide has (1) an aromatic carbon ring, e.g., a benzene or naphthalene ring system, and (2) the heterocyclic linkage comprising a 5 or 6 membered ring containing 1 or more nitrogen atoms and double bonded carbon to carbon and/or carbon to nitrogen and/or carbonyl groups. Preferably, there are essentially no non-aromatic carbon atoms with hydrogen atoms attached thereto. The linkage systems in the polyimides are, in general, capable of assuming resonant double bond configurations. These resins are, in general, linear polymers, but are extremely high melting by virtue of their high molecular weight and strong intermolecular attraction.

The wires which are coated can be individual wires or they can be in the form of multi-conductor lead wires or even in the form of cables. The invention is also suitable with printed circuits having a perfluorocarbon polymer insulation.

Examples of suitable perfluorocarbon polymers are polytetrafluoroethylene, polyhexafluoropropylene, tetrafluoroethylene-hexafluoropropylene copolymers having weight ratios of 1:94 or 99:1 or 75:25 or 30:70 or 34:66 or 19:90 or 1:2 or 4:3 or 23.8:30 or 85:15, 80:20 or 50:50.

The perfluorocarbon polymer, e.g., Teflon, is applied to the electrical conductor by extrusion, tape wrapping or other conventional procedure. The Teflon layer is usually .001 to .030 inch, although this can be varied to make a thinner or thicker insulating layer. The Teflon layer is then prepared for further treatment by wiping the insulation with a cleaning solution. Any of the conventional degreasing solvents can be used, e.g., acetone, methyl ethyl ketone, trichloroethylene, ethylene dichloride, dichloroethylene, methylene dichloride or similar ketones and polychloro aliphatic hydrocarbons.

The cleaned perfluorocarbon polymer, e.g., polytetrafluoroethylene is then treated with a bonding agent, e.g. lithium, sodium or a solution of an alkali metal such as sodium or potassium metal in liquid ammonia, e.g., 1% of sodium or 10% sodium in liquid ammonia, or a solution, e.g., a 5% solution of sodium metal in molten naphthalene, sodium-naphthalene dissolved in tetrahydrofuran. Other bonding agents can be employed such as alkaline earth metals, e.g., calcium, or manganese or zinc, as shown in Purvis Patent 2,789,065. Also, there can be used a bonding agent containing colloidal silica and Teflon in aqueous dispersion as shown in Doban Patent 2,906,658, as well as an aqueous dispersion of finely divided carbon alumina or titania.

The bonding or etching agent is then neutralized by passing the jacketed wire through a solution of acetic acid, preferably admixed with carbon tetrachloride. Alternatively, the jacketing wire can be water washed to remove the etching agent.

Any conventional metallic conductor can be employed, e.g., copper, silver, silver-plated copper or conductive alloys, e.g., stainless steel.

As the polyimide there can be used materials such as poly para-phenylene pyromellitimide, the polypyromellitimide prepared from 3,3'-diamino diphenyl and pyromellitic dianhydride, naphthylene polypyromellitimide (from 1,4-diamino naphthalene and pyromellitic dianhydride), the polypyromellitimide from benzidine and pyromellitic dianhydride, poly paraphenylene bis(1,1-dimethyl-5-pentamethylene) pyromellitimide, poly nonamethylene pyromellitimide, poly 4,4-dimethylheptamethylene pyromellitimide, poly 3-methylheptamethylene pyromellitimide, poly ethylene pyromellitimide, poly trimethylene pyromellitimide, poly o-xylylene pyromellitimide, poly p-xylylene pyromellitimide, poly m-xylylene pyromellitimide, poly 2,11-dodecylene pyromellitimide, the polymeric pyromellitimide from bis(gamma - aminopropyl) ether and pyromellitic dianhydride, the polymeric heterocyclic imide from 2,3,6,7-naphthalene tetracarboxylic dianhydride and p-phenylene diamine, the polymeric heterocyclic imide from 2,3,6,7-naphthalene tetracarboxylic dianhydride and benzidine, the polymeric heterocylic imide from 3,3',4,4'-diphenyl tetra carboxylic dianhydride and m-phenylene diamine, the polybenzimidazole from 3,3'-diaminobenzidine and sebacic acid, the polybenzimidazole from 2,2 - bis(3,4 - diaminophenyl) propane and adipic acid, polybenzimidazoles having the formula

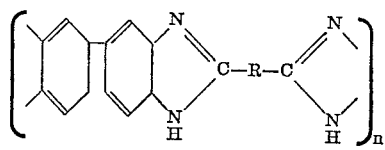

where R is

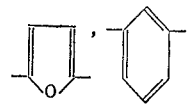

or

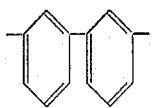

and $n$ is an integer of 30 or more. Usually, the polymer has a molecular weight of above 10,000.

Additional polybenzimidazoles include poly-2,5(6)-benzimidazole of inherent viscosity 1.27; poly-2,2'-(tetramethylene)-5,5'-bibenzimidazole of inherent viscosity 3.19; the polybenzimidazoles from (1) a mixture of equal mols of 3,3'-diaminobenzidine and diphenyl pinate and having an inherent viscosity of 1.03, and (2) from 3,3'-diaminobenzidine and diphenyl homopinate, poly-2,2'-(m-phenylene)-5,5-bibenzimidazole having an inherent viscosity of 1.02 in 0.5% solution in dimethyl sulfoxide; poly-2,2'-(pyridylene-3'',5'')-5,5'-bibenzimidazole, inherent viscosity of 0.38 in 0.2% solution in dimethyl sulfoxide; poly-2,2'-(p-phenylene)-5,5'-bibenzimidazole having an inherent viscosity of 1.00; poly-2,2'-(furylene-2'',5'')-5,5'-bibenzimidazole having an inherent viscosity of 0.3 in 0.2% solution in dimethyl sulfoxide; polybenzimidazole from heating equal molar amounts of 3,3'-diaminobenzidine and diphenyl naphthalene-1,6-dicarboxylate, said product having an inherent viscosity of 0.86 in 0.2% solution in dimethyl sulfoxide; polybenzimidazole from 3,3'-diaminobenzidine and an equal molar amount of diphenyl biphenyl-1,8-dicarboxylate, said polymer having an inherent viscosity of 0.86 in 0.2% solution in sulfuric acid; polybenzimidazole from 3,3'-diaminobenzidine and an equal molar amount of diphenyl diphenate, said polymer having an inherent viscosity of 1.17 in 0.2% dimethyl sulfoxide; poly-2,6-(tetramethylene)-diimidazobenzene having an inherent viscosity of 2.51; poly-2,6-(m-phenylene)-diimidazobenzene having an inherent viscosity of 1.1; polymer from condensing equal molar amounts of dimethylisophthalate and 3,3'-diaminobenzidine, said polymer having an inherent viscosity of 0.46; the polymer from condensing equal molar amounts of isophthalic acid and 3,3'-diaminobenzidine, said polymer having an inherent viscosity of 0.68; polybenzimidazole by condensation of phenyl 3,4-diaminobenzoate with removal of the phenol formed; the polybenzimidazole made by reacting equal molar amounts of 1,2,4,5-tetraminobenzene with (a) dimethyl isophthalate, (b) dimethyl terephthalate, (c) 2,5-naphthalene dicarboxylic acid, (d) diphenyl 2,6-naphthalene dicarboxylate, (e) adipic acid, or (f) dimethyl 3,5-pyridine dicarboxylate; the polybenzimidazoles from reacting 2,3,6,7-tetramino naphthalene with an equal molar amount of (a) diphenyl terephthalate, (b) dimethyl adipate, (c) isophthalic acid, or (d) diphenyl sebacate; the polybenzimidazoles from condensing tetramino stilbene having the amino groups paired in ortho positions with an equal molar amount of (a) dimethyl terephthalate, (b) adipic acid, or (c) diphenyl isophthalate; the polymeric 6 membered heterocylic ring compounds made by condensing 1,4,5,8-tetramino naphthalene with an equal molar amount of (a) diphenyl terephthalate, (b) dimethyl isophthalate, or (c) dimethyl adipate; the polymeric imides made by homopolymerizing (a) 4-amino phthalic anhydride or (b) 4,5-diamino phthalic anhydride. These polymers are made in known fashion, as shown in Vogel et al., Journal of Polymer Science, vol. 50, pages 511–539 (1961), Edwards Patent 2,867,609, Edwards Patent 2,710,853, Edwards Patent 2,900,369 and Brinker Patent 2,895,948. The entire disclosures of the Edwards patents, Brinker and Vogel et al. are hereby incorporated by reference.

The polymeric imide is applied to the fluorocarbon polymer insulation as a solution in any convenient solvent, such as formic acid, dimethyl sulfoxide, sulfuric acid, N-methylpyrrolidone, N-methyl caprolactam, dimethyl acetamide, a mixture of N-methylpyrrolidone, dimethyl acetamide and toluene (6:3:4) hereinafter called Thinner-T, dimethyl formamide, pyridine, dimethyl sulfone, p-cresol, m-p-cresol mixture, cresylic acid.

Unless otherwise indicated all parts and percentages are by weight.

The polyimide jacketed perfluorocarbon polymer insulated electrical conductors have good potting qualities and are eminently suited for encapsulation in electrical assemblies filled by cast resins, e.g., those of the epoxy type, such as diphenylolpropane-epichlorhydrin resin, novolac-epichlorhydrin resins (phenol-formaldehyde novolac), polymeric butadiene diepoxide, etc.

The preferred polyimide is the material Pyre-ML (sold by Du Pont and being a polybenzimide made by condensing equal molar amounts of an aromatic hydrocarbon diamine with pyromellitic dianhydride).

According to the invention the electrical conductor is first coated with the Teflon or other perfluorocarbon polymer and then the polyimide is applied from a solution and the solvent removed by drying. It is sometimes desirable to place a Teflon or other perfluorocarbon polymer jacket over the polyimide layer. To further improve abrasion resistance and other properties a second layer of polymeric imide can be applied, e.g., from solution in N-methylpyrrolidone, over the second Teflon layer.

It has been found that a polyimide coating of as little as 0.0005 inch improves the abrasion resistance 80% over Teflon or FEP insulated conductors not having such a jacket. It has also been observed that cut-through resistance at 200° C. from failure of FEP at 1 minute to no failure at 24 hours using the polyimide jacket is employed.

Pottability in diphenylolpropane epichlorhydrin resin was improved 54% by use of the polyimide jacket over the Teflon.

The invention will be understood best in connection with the drawings wherein:

FIGURE 1 is a view partially broken away showing a twisted conductor construction;

FIGURE 2 is a sectional view along the line 2—2 of FIGURE 1;

FIGURE 3 is a sectional view along the line 3—3 of FIGURE 1; and

FIGURE 4 is a sectional view of an alternative form of the invention.

Referring more specifically to the drawings, as shown in FIGURE 1, there is illustrated a coated electrical conductor 4, e.g., made of silver-plated copper. The conductor comprises three twisted strands 6, 8 and 10 which are enclosed in polytetrafluoroethylene jacket 12.

As shown best in FIGURES 2 and 3, each of the strands of the electrical conductor has a copper core identified as 14, 16 and 18 and a plating layer of silver 20, 22 or 24 thereon. The thickness of the silver layer is somewhat exaggerated in the drawings. Surrounding each of the silver layers 20, 22 and 24 is an insulating layer of extruded polytetrafluoroethylene 26, 28 or 30. The outer surface 32 of the polytetrafluoroethylene layer 26 is in etched condition so that the polymeric imide will adhere thereto. Similarly, the outer surfaces of the layers 28 and 30 are etched to aid in adhering the polymeric imide.

Next, there is applied a thin jacket 34, 36 or 38 of the polymeric imide, e.g., Pyre-ML or poly paraphenylene pyromellitimide. Finally, there is applied around the three strands of the twisted construction a polytetrafluoroethylene jacket.

FIGURE 4 shows a single wire construction comprising a copper core 40, a silver-plated layer 42, a Teflon insulation layer 44, which is etched on its outer surface 46 and which also has a thin coating or jacket 48 made of Pyre-ML or the polypyromellitimide prepared from equal moles of 3,3'-diaminodiphenyl and pyromellitic anhydride. In the drawings the thickness of the Teflon and polymeric imide coatings is greatly exaggerated.

*Example 1*

As the conductor there was employed #20 AWG 19/32

SPC (19 strands of #32 AWG silver-plated copper) wire which had an external diameter of 0.040 inch. Each of the strands had an extruded Teflon coating 0.008 to 0.011 inch thick. The Teflon coated conductor was cleaned by passing it through an alcohol bath and the surface of the Teflon coat was etched by passing it through a bath of sodium-naphthalene in tetrahydrofuran (23 grams of sodium and 128 grams of naphthalene in 1 liter of tetrahydrofuran). The time of etching was short, approximately ⅓ second. (Desirably, etching is accomplished in not over 2 seconds.) After the coated conductor passed through the etching bath it passed through an acetone bath to stop the etching and then was passed through a water bath. The Teflon coated conductor was then passed at a linear speed of 25 ft./min. through a two-zone vertical oven A having a temperature at the bottom of 330° to 350° F. and 510° to 530° F. in the top zone. The thus dried Teflon coated conductor was then led through a bath of 16½ Pyre-ML in N-methyl pyrrolidone at 101° to 105° F. and while still wet led through the drying oven A at the temperatures and speed already indicated. The coated conductor was again passed through the Pyre-ML solution, and while still wet, was passed through the oven A. Then, the coated conductor was passed through the Pyre-ML solution for a third time, and again through the oven A while wet. Next, the coated conductor in the dry state was passed through the oven A. All of the oven passes were at the temperatures and speeds previously indicated. By this procedure there was built up a Pyre-ML coat .0005 to .0009 inch. The coating with the Pyre-ML resulted in an 80% increase in the abrasion resistance over the use of Teflon alone.

*Example 2*

The procedure of Example 1 was repeated but instead of employing Pyre-ML in N-methyl pyrrolidone to form an abrasion-resistant coating on the Teflon there was employed a 16½% solution of poly paraphenylene pyromellitimide in N-methyl pyrrolidone. There was a similar improvement in the abrasion resistance to that noted in Example 1.

*Example 3*

The procedure of Example 1 was repeated except that the Teflon coated conductor was passed through the Pyre-ML solution a sufficient number of times to impart a coating of the Pyre-ML of .0013 to .0017 inch. Following the final dry pass in the oven A there was applied to the Teflon coated conductor with the Pyre-ML coat an external jacket of extruded Teflon to give a product having a final external diameter of .080 to .084 inch.

*Example 4*

The procedure of Example 3 was repeated except that instead of employing the Pyre-ML there was employed a 10% solution in dimethyl formamide of the poly pyromellitimide prepared from equal molar amounts of 3,3'-diamino diphenyl and pyromellitic dianhydride.

*Example 5*

There were provided seven conductors made of the #20 AWG 19/32 SPC material used in Example 1. Each of these conductors had a Teflon coat as in Example 1. The Teflon coat had pigment in it as follows:

Conductor 1—black
Conductor 2—red
Conductor 3—yellow
Conductor 4—green
Conductor 5—white
Conductor 6—colorless
Conductor 7—brown Each of these Teflon conductors were treated as in Example 1 to render the Teflon susceptible to building and then was given a Pyre-ML coat utilizing the procedure of Example 1 to obtain a Pyre-ML coating thickness of .0005 to .0009 inch. A cable was then made from the conductors utilizing the black conductor in the center as the core and in a surrounding layer employing the other six conductors about the core, employing a left-hand lay and a length of 2.25 inches from one high point to the next in wrapping the conductors. Next, a shield of #36 AWG wire comprising 96% copper with 4% silver as a coat on the copper was employed around the cable. Following this, there was applied a jacket of Teflon in natural color. The construction at this point was passed through a two-zone oven B having a bottom temperature of 310° to 315° F. and a top zone temperature of 490° to 510° F. at a speed between 8 and 12 feet per minute. Then, a further dip coat of the Pyre-ML was employed. This second dip coat is hereinafter called a jacket. The jacket coat was allowed to build up to .0005 to .0009 inch. It was applied by dipping the conductor into a solution of 1 part of the Pyre-ML solution employed in Example 1 diluted with 3 parts of Thinner-T at a temperature of 80° to 83° F. and was then passed through the two-zone oven B while still wet. This was repeated to give a total of four dips in the thinned Pyre-ML solution followed by four wet passes through the oven B. Finally, a dry pass through the oven B was employed. As stated, the build of the Pyre-ML jacket was .0005 to .0009 inch.

*Example 6*

The procedure of Example 5 was repeated but in place of using the Pyre-ML solutions and the thinned Pyre-ML solution there was employed in the first coating stage a 16½% solution of poly para-phenylene pyromellitimide in N-methyl pyrrolidone and the jacket coat of Pyre-ML was substituted by utilizing the poly para-phenylene pyromellitimide solution 1 part cut with 3 parts of Thinner-T.

*Example 7*

The procedure of Example 1 was repeated but instead of employing the Teflon coated conductor there was employed a conductor coated with a tetrafluoroethylene-hexafluoropropylene copolymer (80:20) (FEP) and there was employed #22 AWG 19/34 SPC wire (19 strands of #34 AWG silver-plated copper conductor). The FEP insulated conductor had an outside diameter of .041 to .044 inch. Additionally, the procedure was modified by eliminating the last dry pass in oven A. The Pyre-ML coat had a wall thickness of .0007 inch±.0002 inch. It was noted that by application of the Pyre-ML coating the cut-through resistance at 200° C. was improved to such an extent that there was no failure after 24 hours when the polyimide coating was applied, whereas when the FEP insulation was employed without such coating, there was failure in the cut-through tests at 200° C. in 1 minute.

*Example 8*

The procedure of Example 7 was repeated employing in place of the Pyre-ML solution a 10% solution of poly para-phenylene pyromellitimide in dimethyl formamide with similar improvement in the cut-through resistance being noted.

*Example 9*

The procedure of Example 1 was repeated utilizing the FEP insulation of Example 7 rather than Teflon and utilizing #24 AWG 19/36 SPC wire. The FEP insulation had a thickness of .004 to .006 inch. The Pyre-ML coating on the FEP had a wall thickness of .0008 to .0012 inch. The final dry pass through oven A was omitted and a jacket of the FEP was extruded over the Pyre-ML coating. This final jacket had a wall thickness of .0048 to .0072 inch.

*Example 10*

The procedure of Example 9 was repeated employing the polyimide solution of Example 2 rather than the polyimide solution of Example 1.

Example 11

The procedure of Example 9 was repeated except that after the application of the second FEP insulation (designated the jacket coat in Example 9) the material was dried by passing it through oven B and then alternate dips in the Pyre-ML solution diluted with 3 parts of Thinner-T, followed by passage while still wet through oven B, were employed until there were a total of four wet passes in the oven B and, finally, a dry pass was made through the oven B. The second Pyre-ML dip coat had a wall thickness of .0008 to .0012 inch.

Example 12

The procedure of Example 11 was employed except that instead of using the Pyre-ML solutions there were employed the corresponding solutions of Example 6.

In the specific examples above, the passes before going through oven A were by the die application procedure, whereas, in the passes before going through oven B were by the solution dip procedure.

If it is desired to have a thicker coat, this can be accomplished by the use of additional wet passes as is well known in the art.

An alternative procedure that can be employed especially with the Teflon jacket is to insulate the conductor with Teflon in the usual manner, surface treat the Teflon and prepare it for reception of the Pyre-ML or other polyimide in the manner previously described. Then, using conventional Teflon extrusion equipment, dip the Teflon coated lead wire through a thin solution of Pyre-ML or the thin polyimide solution of Example 6, and then directly through a guider tube with a specially selected tip. Next, a Teflon jacket is extruded over the varnish. Following this, there is simultaneous curing above the sintering temperature of Teflon to provide an interface adhesion of the polyimide and Teflon with a strong and abrasion-resistant bond.

What is claimed is:

1. An electrical conductor having an insulating layer of a perfluorocarbon polymer and a layer of a heterocyclic polymeric imide bonded to and surrounding said perfluorocarbon polymer layer, said polymeric imide being selected from the group consisting of compounds having a member of the group consisting of benzene and naphthalene rings joined to two carbon atoms of a heterocyclic imide ring having 5 to 6 members in the ring, one to two of the atoms of the heterocyclic ring being nitrogen atoms and the balance of the atoms of the heterocyclic ring being carbon atoms.

2. An electrical conductor according to claim 1 wherein said perfluorocarbon polymer is selected from the group consisting of polytetrafluoroethylene, polyhexafluoropropylene and tetrafluoroethylene-hexafluoropropylene copolymers.

3. An electrical conductor having an insulating layer of a perfluorocarbon polymer of the group consisting of polytetrafluoroethylene, polyhexafluoroethylene and tetrafluoroethylene-hexafluoropropylene copolymers and a layer of a heterocyclic polymeric imide having a member of the group consisting of benzene and naphthalene rings joined to 2 carbon atoms of a heterocyclic ring having 5 carbon atoms in the heterocyclic ring bonded to and surrounding said perfluorocarbon polymer.

4. An electrical conductor according to claim 3 wherein said polymeric imide is a polybenzimidazole.

5. An electrical conductor according to claim 3 wherein the polymeric imide is a poly pyromellitimide.

6. An electrical conductor according to claim 3 wherein the surface of the fluorocarbon polymer which contacts the polymeric imide is in an etched condition.

7. An electrical conductor according to claim 1 including a second layer of said perfluorocarbon polymer surrounding said layer of polymeric imide.

8. An electrical conductor according to claim 7 having a second layer of said polymeric imide surrounding said second perfluorocarbon polymer layer.

9. An electrical conductor according to claim 3 including a second layer of said perfluorocarbon polymer surrounding said layer of polymeric imide.

10. An electrical conductor according to claim 9 having a second layer of said polymeric imide surrounding said second perfluorocarbon polymer layer.

11. A process of increasing the abrasion resistance of an electrical conductor having an insulation of a perfluorocarbon polymer comprising etching the surface of the polymer, removing the etching agent and coating the etched polymer surface with a heterocyclic polymeric imide, said polymeric imide being selected from the group consisting of compounds having a member of the group consisting of benzene and naphthalene rings joined to two carbon atoms of a heterocyclic imide ring having 5 to 6 members in the ring, one to two of the atoms of the heterocyclic ring being nitrogen atoms and the balance of the atoms of the heterocyclic ring being carbon atoms.

12. A process according to claim 11 wherein the imide is applied from a solution in a solvent.

13. A process according to claim 12 wherein the etching agent is allowed to act for less than 5 seconds.

14. A process according to claim 11 wherein the heterocyclic polymeric imide is a poly pyromellitimide.

15. A process according to claim 11 wherein the heterocyclic polymeric imide is a polybenzimidazole.

16. A process according to claim 11 wherein a second layer of the perfluorocarbon polymer is applied over the polymeric imide layer.

17. A process according to claim 11 wherein a second layer of the polymeric imide is applied over the second layer of perfluorocarbon polymer.

18. A process according to claim 17 wherein the polymeric imide layers are applied from a solution in a solvent for the polymeric imide, the first layer of polymeric imide is cured at 510° to 530° F. and the second layer of polymeric imide is cured at 510° to 530° F. and the second layer of polymeric imide is cured at 490° to 510° F.

19. A process according to claim 11 wherein the etched polymer surface is coated with a first solution of the imide in a solvent, the solvent removed by heating, the coated conductor passed again through a solvent solution of the imide and the solvent removed by heating in order to build up an increased thickness of the heterocyclic polymeric imide as the result of the plural coating.

References Cited by the Examiner

UNITED STATES PATENTS

| | | | |
|---|---|---|---|
| 2,186,793 | 1/40 | Wodtke | 174—27 |
| 2,809,130 | 10/57 | Rappaport | 161—189 |
| 2,867,609 | 1/59 | Edwards et al. | 260—78 |
| 2,888,367 | 5/59 | Greyson | 117—232 X |
| 2,911,328 | 11/59 | Goldsmith | 117—232 X |
| 3,030,290 | 4/62 | Ryan | 117—138.8 |
| 3,063,882 | 11/62 | Cheshire | 117—138.8 X |
| 3,122,445 | 2/64 | Osborn | 117—138.8 X |

FOREIGN PATENTS

| | | |
|---|---|---|
| 616,505 | 3/61 | Canada. |
| 793,731 | 4/58 | Great Britain. |

E. JAMES SAX, *Primary Examiner.*

LARAMIE E. ASKIN, *Examiner.*